(12) United States Patent
Pan et al.

(10) Patent No.: US 10,171,174 B1
(45) Date of Patent: Jan. 1, 2019

(54) METHOD AND SYSTEM FOR OPTICAL VECTOR ANALYSIS

(71) Applicant: Suzhou Liuyaosi Information Technology Co., Ltd., Changshu (CN)

(72) Inventors: Shilong Pan, Changshu (CN); Min Xue, Changshu (CN); Shifeng Liu, Changshu (CN); Shupeng Li, Changshu (CN); Jianbin Fu, Changshu (CN); Wansheng Pan, Changshu (CN)

(73) Assignee: SUZHOU LIUYAOSI INFORMATION TECHNOLOGY CO., LTD., Changshu (CN)

( * ) Notice: Subject to any disclaimer, the term of this patent is extended or adjusted under 35 U.S.C. 154(b) by 0 days.

(21) Appl. No.: 15/641,410

(22) Filed: Jul. 5, 2017

(51) Int. Cl.
*H04B 17/00* (2015.01)
*H04B 10/516* (2013.01)
*H04B 10/079* (2013.01)

(52) U.S. Cl.
CPC ... *H04B 10/5161* (2013.01); *H04B 10/07955* (2013.01)

(58) Field of Classification Search
CPC ............. H04B 10/5161; H04B 10/07955
USPC .......................................................... 398/38
See application file for complete search history.

(56) References Cited

U.S. PATENT DOCUMENTS

| 5,175,492 A | * | 12/1992 | Wong ............... G01M 11/30 324/74 |
| 2006/0238770 A1 | * | 10/2006 | Szafraniec ......... G01M 11/337 356/477 |
| 2008/0013096 A1 | * | 1/2008 | Bernini ............... G01D 5/268 356/483 |
| 2015/0377777 A1 | * | 12/2015 | Ben-Levy ........... G01N 21/41 435/29 |

FOREIGN PATENT DOCUMENTS

CN 105738080 A 7/2016

OTHER PUBLICATIONS

Chao He, Shilong Pan, Ronghui Guo, Yongjiu Zhao, and Minghai Pan, "Ultrafast optical frequency comb generated based on cascaded polarization modulators," Optics Letters vol. 37, No. 18, pp. 3834-3836, published on Sep. 15, 2012.
Shilong Pan, and Min Xue, "Ultrahigh-resolution optical vector analysis based on optical single-sideband modulation," Journal of Lightwave Technology, vol. 35, No. 4, pp. 836-845, published on Feb. 15, 2017.

* cited by examiner

*Primary Examiner* — Don N Vo
(74) *Attorney, Agent, or Firm* — IPro, PLLC

(57) ABSTRACT

An apparatus comprises a phase modulator having a first input port to receive a radiation and having a first output port to provide a first signal toward a device under test (DUT), wherein the phase modulator is configured to generate the first signal by performing phase modulation on the radiation received at the first input port; an intensity modulator having a second input port to receive the radiation and having a second output port to provide a second signal toward the DUT, wherein the intensity modulator is configured to generate the second signal by performing intensity modulation on the radiation received at the second input port; and a transfer function analyzer configured to determine a transfer function of the DUT based on the first signal and the second signal.

20 Claims, 7 Drawing Sheets under the present disclosure.

METHOD AND SYSTEM FOR OPTICAL VECTOR ANALYSIS

BACKGROUND

1. Technical Field

The present disclosure relates generally to a method and a system related to performing optical vector analysis. In particular, the present disclosure relates to a method and a system suitable for determining a transfer function of an optical device at various operating frequencies.

2. Discussion of Technical Background

Optical vector analysis may be performed to determine a transfer function of an optical device at various operating frequencies of the optical device. The transfer function of the optical device may also be referred to as a transmission response of the optical device, indicating a relationship, caused by the optical device, between an input signal received by the optical device and an output signal outputted by the optical device. The transfer function of the optical device may be further used to determine a plurality of characteristics of the optical device at the various operating frequencies. Examples of the characteristics may include, but not limited to, insertion loss, dispersion, group delay, polarization dependent loss, and polarization mode dispersion.

A traditional method for performing the optical vector analysis on the optical device may be based on a single sideband modulation of an optical signal passing through the optical device. The single sideband modulation may be implemented by performing double sideband modulation on the optical signal, followed by a suitable process for keeping one sideband on one side of each carrier frequency of the optical signal while suppressing the sideband on the other side of the carrier frequency. However, it is extremely difficult to eliminate one of the two sidebands associated with each carrier frequency completely for achieving an ideal single sideband modulation, which results in a limited dynamic range and accuracy for the optical vector analysis. Therefore, there is a need for an improved method and apparatus for performing the optical vector analysis.

SUMMARY

In an exemplary embodiment, there is provided an apparatus comprising: a phase modulator having a first input port to receive a radiation and having a first output port to provide a first signal toward a device under test (DUT), wherein the phase modulator is configured to generate the first signal by performing phase modulation on the radiation received at the first input port; an intensity modulator having a second input port to receive the radiation and having a second output port to provide a second signal toward the DUT, wherein the intensity modulator is configured to generate the second signal by performing intensity modulation on the radiation received at the second input port; and a transfer function analyzer configured to determine a transfer function of the DUT based on the first signal and the second signal.

In yet another exemplary embodiment, there is provided a method comprising: providing a first signal by performing phase modulation on a radiation; passing the first signal through a DUT; providing a second signal by performing intensity modulation on the radiation; passing the second signal through the DUT; and determining a transfer function of the DUT based on the first signal and the second signal.

Other concepts relate to software for performing the optical vector analysis as described herein. A software product, in accord with this concept, includes at least one machine-readable non-transitory medium and information carried by the medium.

In an exemplary embodiment, there is provided a machine-readable tangible and non-transitory medium having information, wherein the information, when read by a hardware processor system, causes the hardware processor system to perform following: providing a first signal by performing phase modulation on a radiation; passing the first signal through a DUT; providing a second signal by performing intensity modulation on the radiation; passing the second signal through the DUT; and determining a transfer function of the DUT based on the first signal and the second signal.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 1:
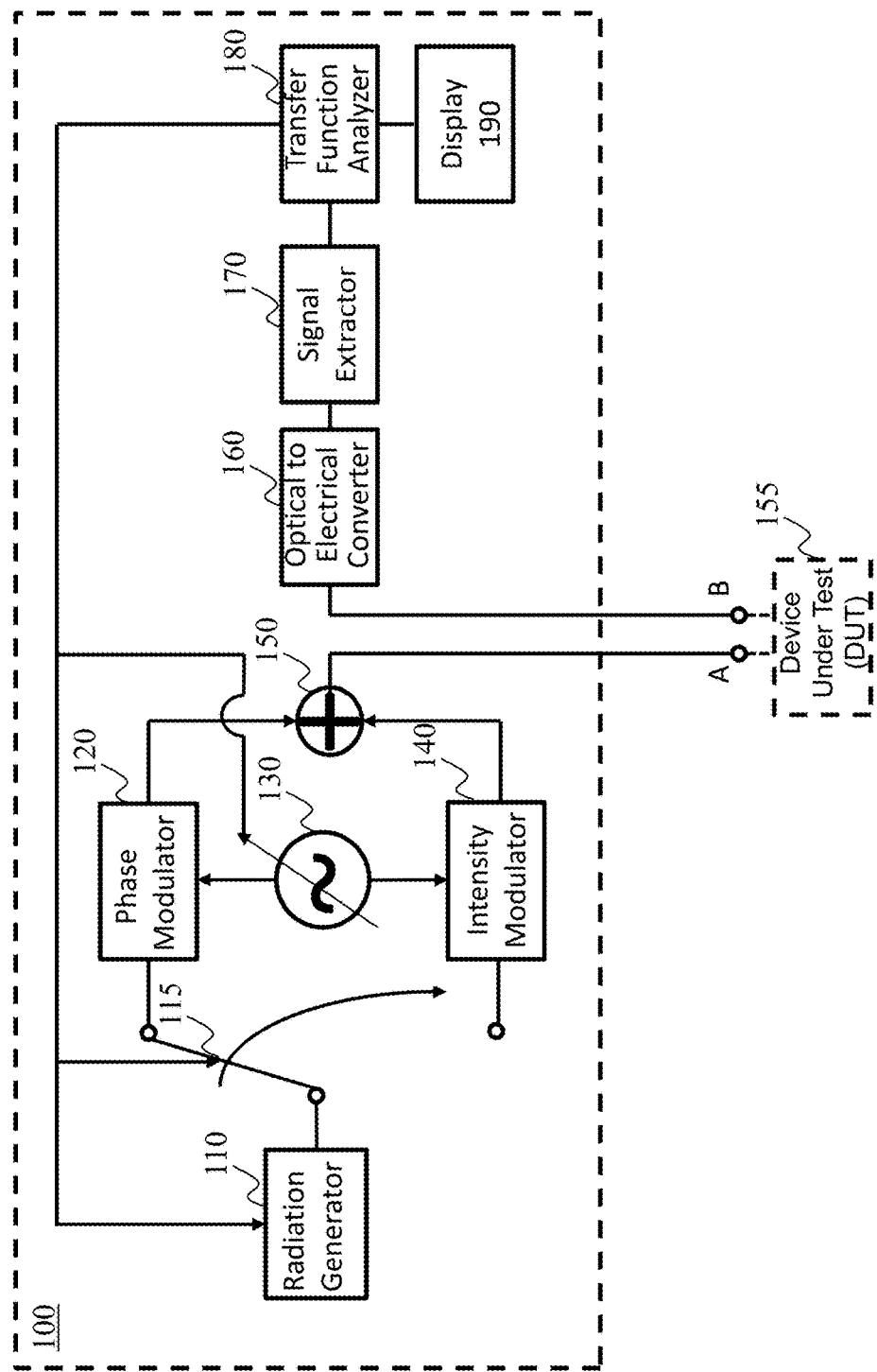
FIG. 1 is a schematic diagram of an optical vector analyzer suitable for performing optical vector analysis on a device under test (DUT) according to an embodiment of the present disclosure.

Referring to FIG. 1, a schematic diagram of an optical vector analyzer 100 is shown according to an embodiment of the disclosure. The optical vector analyzer 100 may be used to perform an optical vector analysis on a device under test (DUT) 155. In particular, the optical vector analyzer 100 may be used to determine a transfer function of the DUT 155 at various operating frequencies. As shown, the optical vector analyzer 100 may comprise a radiation generator 110, a phase modulator 120, a tunable radio-frequency (RF) signal generator 130, an intensity modulator 140, an optical combiner 150, an optical to electrical converter 160, a signal extractor 170, a transfer function analyzer 180, and a display 190. The various components may be arranged as shown or in any other suitable manner.

The radiation generator 110 may be configured to provide an electromagnetic radiation to the phase modulator 120 and/or the intensity modulator 140. In an embodiment, the radiation generator 110 may be configured to provide an electromagnetic radiation having a frequency carrier at a single wavelength or a narrow wavelength range around a center wavelength. The single wavelength or the center wavelength may correspond to a carrier frequency. The carrier frequency may be tunable. In some examples, the radiation generator 110 may be a single wavelength laser. In some examples, the radiation generator 110 may be configured to provide the electromagnetic radiation based on an comb source 210 followed by a tunable bandpass filter 220 as described in FIG. 2. As shown, the radiation generator 110 may be coupled to the transfer function analyzer 180, which may be used to adjust the carrier frequency of the electromagnetic radiation provided by the radiation generator 110.

The optical switch 115 may be coupled to the radiation generator 110 and configured to provide the electromagnetic radiation from the radiation generator 110 to the phase modulator 120 or the intensity modulator 140. As shown, the optical switch 115 may be coupled to the transfer function analyzer 180, which may be used to control the optical switch 115 and determine whether the optical switch 115 is to be configured to provide the electromagnetic radiation from the radiation generator 110 to the phase modulator 120 or the intensity modulator 140.

The tunable RF signal generator 130 may be configured to provide an RF signal to the phase modulator 120 and the intensity modulator 140. In an embodiment, the RF signal may be a sinusoidal signal at a modulating frequency used to drive the phase modulator 120 and the intensity modulator 140 and perform a double sideband modulation. In an embodiment, the modulating frequency of the RF signal may be tunable. As shown, the tunable RF signal generator 130 may be coupled to the transfer function analyzer 180, which may be used to adjust the modulating frequency of the RF signal provided by the tunable RF signal generator 130.

The phase modulator 120 may have an input port coupled to the optical switch 115 and configured to receive the electromagnetic radiation from the radiation generator 110. The phase modulator 120 may be configured to perform a double sideband phase modulation on the electromagnetic radiation based on the RF signal at the modulating frequency provided by the tunable RF signal generator 130. The phase modulator 120 may further have an output port coupled to the optical combiner 150 and configured to provide a phase modulated signal. In an embodiment, the phase modulated signal may be generated by performing a double sideband phase modulation on the electromagnetic radiation received at the input port of the phase modulator 120. In particular, the phase modulated signal may comprise a first frequency component at a first frequency which is equal to the carrier frequency, a second frequency component at a second frequency which is equal to the carrier frequency minus the modulating frequency, and a third frequency component at a third frequency which is equal to the carrier frequency plus the modulating frequency. The amplitude of the second frequency component of the phase modulated signal may be equal to or substantially similar to the amplitude of the third frequency component of the phase modulated signal.

The intensity modulator 140 may have an input port coupled to the optical switch 115 and configured to receive the electromagnetic radiation from the radiation generator 110. The intensity modulator 140 may be configured to perform a double sideband intensity modulation on the electromagnetic radiation based on the RF signal at the modulating frequency provided by the tunable RF signal generator 130. The intensity modulator 140 may further have an output port coupled to the optical combiner 150 and configured to provide an intensity modulated signal. In an embodiment, the intensity modulated signal may be generated by performing a double sideband intensity modulation on the electromagnetic radiation received at the input port of the intensity modulator 140. Similar to the phase modulated signal, the intensity modulated signal may comprise a first frequency component at the first frequency which is equal to the carrier frequency, a second frequency component at a second frequency which is equal to the carrier frequency minus the modulating frequency, and a third frequency component at a third frequency which is equal to the carrier frequency plus the modulating frequency. The amplitude of the second frequency component of the intensity modulated signal may be equal to or substantially similar to the amplitude of the third frequency component of the intensity modulated signal.

The optical combiner 150 may have a first input port coupled to the output port of the phase modulator 120 and configured to receive the phase modulated signal. The optical combiner 150 may have a second input port coupled to the output port of the intensity modulator 140 and configured to receive the intensity modulated signal. The optical combiner 150 may further have an output port, denoted as port A as shown in FIG. 1. At any given time, the electromagnetic radiation provided by the radiation generator 110 may be provided to either the phase modulator 120 or the intensity modulator 140. As a result, the optical combiner 150 may be used to output either the phase modulated signal provided by the phase modulator 120 or the intensity modulated signal provided by the intensity modulator 140, depending on whether the optical switch 115 is configured to provide the electromagnetic radiation to the phase modulator 120 or the intensity modulator 140. The output port of the optical combiner 150, i.e., the Port A, may be coupled to an input port of the DUT 155. Alternatively, the output port of the optical combiner 150, i.e., the Port A, may be coupled to an input port of the optical to electrical converter 160, which is denoted as Port B as shown in FIG. 1.

The optical to electrical converter 160 may have the input port, denoted as port B as shown in FIG. 1. The input port of the optical to electrical converter 160, i.e., the Port B, may be coupled to the output port of the optical combiner 150, i.e., the Port A. As a result, the optical to electrical converter 160 may be configured to convert the phase modulated signal provided by the phase modulator 120 or the intensity modulated signal provided by the intensity modulator 140 to an electrical current, depending on whether the optical switch 115 is configured to provide the electromagnetic radiation from the radiation generator 110 to the phase modulator 120 or the intensity modulator 140.

Alternatively, the input port of the optical to electrical converter 160, i.e., the port B, may be coupled to an output port of the DUT 155, while the output port of the optical combiner 150, i.e., the Port A, may be coupled to the input port of the DUT 155. As a result, the phase modulated signal provided by the phase modulator 120 or the intensity modulated signal provided by the intensity modulator 140 may pass through the DUT 155 toward the optical to electrical converter 160, and then converted by the optical to electrical converter 160 to an electrical current, depending on whether the optical switch 115 is configured to provide the electromagnetic radiation from the radiation generator 110 to the phase modulator 120 or the intensity modulator 140. In an embodiment, the optical to electrical converter 160 is a photodiode or a photodetector.

The signal extractor 170 may have an input port coupled to the output port of the optical to electrical converter 160 and configured to receive the electrical current. The signal extractor 170 may be configured to measure the electrical current. In particular, the signal extractor 170 may be configured to measure the electrical current by measuring the amplitude of the electrical current and the phase of the electrical current at various frequency components of the electrical current, respectively. The signal extractor 170 may further have an output port coupled to an input port of the transfer function analyzer 180 and configured to output the measurement results (i.e., the amplitude and the phase of the electrical current) to the transfer function analyzer 180.

The transfer function analyzer 180 may have the input port coupled to the output port of the signal extractor 170 and configured to receive the measurement results from the signal extractor 170. The transfer function analyzer 180 may be configured to determine the transfer function of the DUT 155 at various operating frequencies based on the measurement results received from the signal extractor 170. The transfer function of the DUT 155 may also be referred to as a transmission response of the DUT 155. In an embodiment, the transfer function of the DUT 155 may be indicative of a relationship, caused by the DUT 155, between an input signal received by the DUT 155 and a corresponding output signal outputted by the DUT 155. The transfer function of the DUT 155 may further be used to determine a plurality of characteristics of the DUT 155 at the various operating frequencies. Examples of the characteristics may include, but not limited to, insertion loss, dispersion, group delay, polarization dependent loss, and polarization mode dispersion.

Further, the transfer function analyzer 180, as described above, may be coupled to the radiation generator 110, the optical switch 115, and the tunable RF signal generator 130. The transfer function analyzer 180 may be configured to adjust the carrier frequency of the electromagnetic radiation provided by the radiation generator 110. The transfer function analyzer 180 may be configured to control the optical switch 115 and determine whether to provide the electromagnetic radiation from the radiation generator 110 to the phase modulator 120 or the intensity modulator. The transfer function analyzer 180 may be configured to adjust the modulating frequency of the RF signal provided by the tunable RF signal generator 130.

The display 190 may have an input port coupled to the output port of the transfer function analyzer 180 and configured to display the transfer function of the DUT 155 and/or the plurality of characteristics of the DUT 155 determined by the transfer function analyzer 180.

In an embodiment, a device characterization process and a system calibration process may be implemented respectively in order to perform the optical vector analysis on the DUT 155. The order of performing the device characterization process and the system calibration process may be interchangeable.

For example, the electrical field of the electromagnetic radiation provided by the radiation generator 110 may be expressed by:

$$E_c(t) = E_0 \exp(i\omega_c t) \tag{1}$$

where $E_c(t)$ represents an electrical field of the electromagnetic radiation provided by the radiation generator 110, $E_0$ represents an amplitude of the electrical field of the electromagnetic radiation, and $\omega_c$ represents the carrier frequency of the electromagnetic radiation.

Prior to performing the device characterization process, the output port of the optical combiner 150, i.e., the Port A, may be coupled to the input port of the DUT 155, while the input port of the optical to electrical converter 160 may be coupled to the output port of the DUT 155, i.e., the port B. The device characterization process may be performed by two steps. The order of performing the two steps may be interchangeable.

In a first step, the optical switch 115 may provide the electromagnetic radiation from the radiation generator 110 to the phase modulator 120, which may be used to provide the phase modulated signal by performing the double sideband phase modulation on the electromagnetic radiation received from the radiation generator 110. The electrical field of the phase modulated signal may be expressed by:

$$E_{PM}(t) = A_0(\omega_e)\exp(i\omega_c t) + \\ A_1(\omega_e)\exp\left[i(\omega_c - \omega_e)t + i\frac{\pi}{2}\right] + A_1(\omega_1)\exp\left[i(\omega_c + \omega_e)t + i\frac{\pi}{2}\right] \tag{2}$$

where $E_{PM}(t)$ represents an electrical field of the phase modulated signal, $\omega_c$ represents the carrier frequency of the electromagnetic radiation, $\omega_e$ represents the modulating frequency of the RF signal provided by the tunable RF signal generator 130, $A_0(\omega_e)$ represents an amplitude of the first frequency component of the phase modulated signal at a first frequency of $\omega_c$, $A_1(\omega_e)$ represents an amplitude of the second frequency component of the phase modulated signal at a second frequency of $(\omega_c - \omega_e)$, and $A_1(\omega_e)$ also represents an amplitude of the third frequency component of the phase modulated signal at a third frequency of $(\omega_c + \omega_e)$.

In an embodiment, the product of $A_0(\omega_e)$ and $A_1(\omega_e)$ may be measured directly by various means. For example, the product of $A_0(\omega_e)$ and $A_1(\omega_e)$ may be measured by a lightwave component analyzer. For example, the product of $A_0(\omega_e)$ and $A_1(\omega_e)$ may be expressed by $H_{PM}(\omega_e)$, which may be measured by the lightwave component analyzer. Thus, $$H_{PM}(\omega_e) = A_0(\omega_e) A_1(\omega_e) \tag{3}$$

The phase modulated signal may pass through the optical combiner 150 and the DUT 155. The electrical field of the phase modulated signal after passing through the DUT 155 may be expressed by:

$$E_{PM}^{out}(t) = H(\omega_c - \omega_e)A_1(\omega_e)\exp\left[i(\omega_c - \omega_e)t + i\frac{\pi}{2}\right] + \qquad (4)$$
$$H(\omega_c)A_0(\omega_e)\exp(i\omega_c t) + H(\omega_c + \omega_e)A_1(\omega_e)\exp\left[i(\omega_c + \omega_e)t + i\frac{\pi}{2}\right]$$

where $E_{PM}^{out}(t)$ represents an electrical field of the phase modulated signal after the phase modulated signal passes through the DUT 155, $H(\omega_c)$ represents the transfer function at the first frequency of $\omega_e$, $H(\omega_c-\omega_e)$ represents the transfer function at the second frequency of $(\omega_c-\omega_e)$, and $H(\omega_c+\omega_e)$ represents the transfer function at the third frequency of $(\omega_c+\omega_e)$.

After passing through the DUT 155, the phase modulated signal may then reach the optical to electrical converter 160, and then may be converted to an electrical current by the optical to electrical converter 160. The signal extractor 170 may measure the electrical current and output the measurement results to the transfer function analyzer 180. The electrical current may be expressed by:

$$i_{PM}(\omega_e) = \eta A_0(\omega_e)A_1(\omega_e)H(\omega_c + \omega_e)H^*(\omega_c)\exp\left(i\frac{\pi}{2}\right) - \qquad (5)$$
$$\eta A_0(\omega_e)A_1(\omega_e)H(\omega_c)H^*(\omega_c - \omega_e)\exp\left(i\frac{\pi}{2}\right)$$

where $i_{PM}(\omega_e)$ represents the electrical current converted from the phase modulated signal, and represents the response coefficient of the optical to electrical converter 160.

In a second step, the optical switch 115 may provide the electromagnetic radiation from the radiation generator 110 to the intensity modulator 140, which may be used to provide the intensity modulated signal by performing a double sideband intensity modulation on the electromagnetic radiation received from the radiation generator 110. The electrical field of the intensity modulated signal may be expressed by:

$$E_{AM}(t) = B_0(\omega_e)\exp(i\omega_c t) + \qquad (6)$$
$$B_1(\omega_e)\exp\left[i(\omega_c - \omega_e)t - i\frac{\pi}{2}\right] + B_1(\omega_e)\exp\left[i(\omega_c + \omega_e)t + i\frac{\pi}{2}\right]$$

where $E_{AM}(t)$ represents an electrical field of the intensity modulated signal, $\omega_c$ represents the carrier frequency of the electromagnetic radiation, $\omega_e$ represents the modulating frequency of the RF signal provided by the tunable RF signal generator 130, $B_0(\omega_e)$ represents an amplitude of the first frequency component of the intensity modulated signal at a first frequency of $\omega_c$, $B_1(\omega_e)$ represents an amplitude of the second frequency component of the intensity modulated signal at a second frequency of $(\omega_c-\omega_e)$, and $B_1(\omega_e)$ also represents an amplitude of the third frequency component of the intensity modulated signal at a third frequency of $(\omega_c+\omega_e)$.

In an embodiment, the product of $B_0(\omega_e)$ and $B_1(\omega_e)$ may be measured directly by various means. For example, the product of $B_0(\omega_e)$ and $B_1(\omega_e)$ may be measured by the lightwave component analyzer. For example, the product of $B_0(\omega_e)$ and $B_1(\omega_e)$ may be expressed by $H_{AM}(\omega_e)$, which may be measured by the lightwave component analyzer. Thus, $$H_{AM}(\omega_e) = B_0(\omega_e)B_1(\omega_e) \qquad (7)$$

The intensity modulated signal may pass through the optical combiner 150 and the DUT 155. The electrical field of the intensity modulated signal after passing through the DUT 155 may be expressed by:

$$E_{AM}^{Out}(t) = \qquad (8)$$
$$H(\omega_c)B_0(\omega_e)\exp(i\omega_c t) + H(\omega_c - \omega_e)B_1(\omega_e)\exp\left[i(\omega_c - \omega_e)t - i\frac{\pi}{2}\right] +$$
$$H(\omega_c + \omega_e)B_1(\omega_e)\exp\left[i(\omega_c + \omega_e)t + i\frac{\pi}{2}\right]$$

where $E_{AM}^{out}(t)$ represents an electrical field of the intensity modulated signal after the intensity modulated signal passes through the DUT 155, $H(\omega_c)$ represents the transfer function at the first frequency of $\omega_c$, $H(\omega_c-\omega_e)$ represents the transfer function at the second frequency of $(\omega_c-\omega_e)$, and $H(\omega_c+\omega_e)$ represents the transfer function at the third frequency of $(\omega_c+\omega_e)$.

After passing through the DUT 155, the intensity modulated signal may reach the optical to electrical converter 160, and then may be converted to an electrical current by the optical to electrical converter 160. The signal extractor 170 may measure the electrical current and output the measurement results to the transfer function analyzer 180. The power of the electrical current may be expressed by:

$$i_{AM}(\omega_e) = \eta B_0(\omega_e)B_1(\omega_e)H(\omega_c + \omega_e)H^*(\omega_c)\exp\left(i\frac{\pi}{2}\right) + \qquad (9)$$
$$\eta B_0(\omega_e)B_1(\omega_e)H(\omega_c)H^*(\omega_c - \omega_e)\exp\left(i\frac{\pi}{2}\right)$$

where $i_{AM}(\omega_e)$ represents the power of the electrical current converted from the intensity modulated signal, $\eta$ represents the response coefficient of the optical to electrical converter 160, $H(\omega_c)$ represents the transfer function at the first frequency of $\omega_c$, $H(\omega_c-\omega_e)$ represents the transfer function at the second frequency of $(\omega_c-\omega_e)$, and $H(\omega_c+\omega_e)$ represents the transfer function at the third frequency of $(\omega_c+\omega_e)$.

Upon completion of the device characterization process, the transfer function analyzer 180 may be configured to make the following determinations based on the equations (3), (5), (7), and (9):

$$H(\omega_c + \omega_e) = \left[\frac{i_{AM}(\omega_e)}{2\eta H_{AM}(\omega_e)} + \frac{i_{PM}(\omega_e)}{2\eta H_{PM}(\omega_e)}\right]/H^*(\omega_c) \qquad (10)$$

$$H(\omega_c - \omega_e) = \left[\frac{i_{AM}^*(\omega_e)}{2\eta H_{AM}^*(\omega_e)} + \frac{i_{PM}^*(\omega_e)}{2\eta H_{PM}^*(\omega_e)}\right]/H^*(\omega_c) \qquad (11)$$

where $H(\omega_c)$ represents a transfer function at the carrier frequency $\omega_c$. It should be noted that $H(\omega_c)$ may be regarded as a constant and may be measured by various means.

Prior to performing the system calibration process, the output port of the optical combiner 150, i.e., the Port A, may be coupled to the input port of optical to electrical converter 160, i.e., the port B. The system calibration process may be performed in a way similar to the device characterization process. Specifically, the system calibration process may be performed by two steps, which may be similar to the two steps in the device calibration process. The order of performing the two steps of the system calibration process may be interchangeable.

Particularly, in the first step of the system calibration process, the optical switch 115 may provide the electromagnetic radiation from the radiation generator 110 to the phase modulator 120, which may be used to provide the phase modulated signal by performing the double sideband phase modulation on the electromagnetic radiation received from the radiation generator 110. The phase modulated signal may pass through the optical combiner 150 toward the optical to electrical converter 160 without passing through the DUT 155, which may be used to convert the phase modulated signal to an electrical current. The electrical current converted from the phase modulated signal, denoted as $i_{PM}^{sys}(\omega_e)$, may be measured by the signal extractor 170.

Further, in the second step of the system calibration process, the optical switch 115 may provide the electromagnetic radiation from the radiation generator 110 to the intensity modulator 140, which may be used to provide the intensity modulated signal by performing the double sideband intensity modulation on the electromagnetic radiation received from the radiation generator 110. The intensity modulated signal may pass through the optical combiner 150 toward the optical to electrical converter 160 without passing through the DUT 155, which may be used to convert the intensity modulated signal to an electrical current. The electrical current converted from the intensity modulated signal, denoted as $i_{AM}^{sys}(\omega_e)$, may be measured by the signal extractor 170. Upon completion of the system calibration process, the transfer function analyzer 180 may be configured to make the following determinations:

$$H_{SYS}(\omega_c + \omega_e) = \left[ \frac{i_{AM}^{SYS}(\omega_e)}{2\eta H_{AM}(\omega_e)} + \frac{i_{PM}^{SYS}(\omega_e)}{2\eta H_{PM}(\omega_e)} \right] / H_{SYS}^*(\omega_c) \quad (12)$$

$$H_{SYS}(\omega_c - \omega_e) = \left[ \frac{i_{AM}^{*SYS}(\omega_e)}{2\eta H_{AM}^*(\omega_e)} - \frac{i_{PM}^{*SYS}(\omega_e)}{2\eta H_{PM}^*(\omega_e)} \right] / H_{SYS}^*(\omega_c) \quad (13)$$

where $H_{SYS}(\omega_c)$ represents the transfer function of the system at the first frequency of $\omega_c$, $H_{SYS}(\omega_c-\omega_e)$ represents the transfer function of the system at the second frequency of $(\omega_c-\omega_e)$, and $H_{SYS}(\omega_c+\omega_e)$ represents the transfer function of the system at the third frequency of $(\omega_c+\omega_e)$.

The relationship between $H(\omega_c-\omega_e)$ and $H_{SYS}(\omega_c-\omega_e)$ and the relationship between $H(\omega_c-\omega_e)$ and $H_{SYS}(\omega_c-\omega_e)$ may be expressed by:

$$H(\omega_c+\omega_e) = H_{SYS}(\omega_c+\omega_e) H_{DUT}(\omega_c+\omega_e) \quad (14)$$

$$H(\omega_c-\omega_e) = H_{SYS}(\omega_c-\omega_e) H_{DUT}(\omega_c-\omega_e) \quad (15)$$

where $H_{DUT}(\omega_c-\omega_e)$ represents the transfer function of the DUT 155 at the second frequency of $(\omega_c-\omega_e)$, and $H_{DUT}(\omega_c+\omega_e)$ represents the transfer function of the DUT 155 at the third frequency of $(\omega_c+\omega_e)$.

Further, the relationship between $H^*(\omega_c)$ and $H^*_{SYS}(\omega_c)$ may be expressed by:

$$H^*(\omega_c) = H^*_{SYS}(\omega_c) H^*_{DUT}(\omega_c) \quad (16)$$

where $H^*(\omega_c)$ represents the complex conjugate of the transfer function at the carrier frequency $\omega_c$, $H^*_{SYS}(\omega_c)$ represents the complex conjugate of the transfer function of the system at the carrier frequency $\omega_c$, and $H^*_{DUT}(\omega_c)$ represents the complex conjugate of the transfer function of the DUT 155 at the carrier frequency $\omega_c$.

Upon completion of both the device characterization process and the system calibration process, the transfer function analyzer 180 may be configured to make the following determinations based on the equations (10)-(16):

$$H_{DUT}(\omega_c + \omega_e) = \quad (17)$$

$$\frac{H(\omega_c + \omega_e)}{H_{SYS}(\omega_c + \omega_e)} = \frac{\left[ \frac{i_{AM}(\omega_e)}{H_{AM}(\omega_e)} + \frac{i_{PM}(\omega_e)}{H_{PM}(\omega_e)} \right]}{\left[ \frac{i_{AM}^{SYS}(\omega_e)}{H_{AM}(\omega_e)} + \frac{i_{PM}^{SYS}(\omega_e)}{H_{PM}(\omega_e)} \right] H_{DUT}^*(\omega_c)}$$

$$H_{DUT}(\omega_c - \omega_e) = \quad (18)$$

$$\frac{H(\omega_c - \omega_e)}{H_{SYS}(\omega_c - \omega_e)} = \frac{\left[ \frac{i_{AM}^*(\omega_e)}{H_{AM}^*(\omega_e)} - \frac{i_{PM}^*(\omega_e)}{H_{PM}^*(\omega)} \right]}{\left[ \frac{i_{AM}^{*SYS}(\omega_e)}{H_{AM}^*(\omega_e)} - \frac{i_{PM}^{*SYS}(\omega_e)}{H_{PM}^*(\omega_e)} \right] H_{DUT}^*(\omega_c)}$$

where $H_{DUT}(\omega_c)$ represents the transfer function of the DUT 155 at the carrier frequency $\omega_c$. It should be noted that $H_{DUT}(\omega_c)$ may be regarded as a constant and may be measured by various means.

In an embodiment, the carrier frequency $\omega_c$ and/or the modulating frequency $\omega_e$ may be adjusted. For example, the carrier frequency $\omega_c$ may be varied by adjusting the radiation generator 110. Alternatively or in addition, the modulating frequency $\omega_e$ may be varied by adjusting the tunable RF signal generator 130. As described above, the radiation generator 110 and/or the tunable RF signal generator 130 may be controlled by the transfer function analyzer 180. This is done so that the transfer function of the DUT 155 at various other operating frequencies may be determined by performing one or more additional sets of the device characterization process and the system calibration process as described above.

Figure 2:
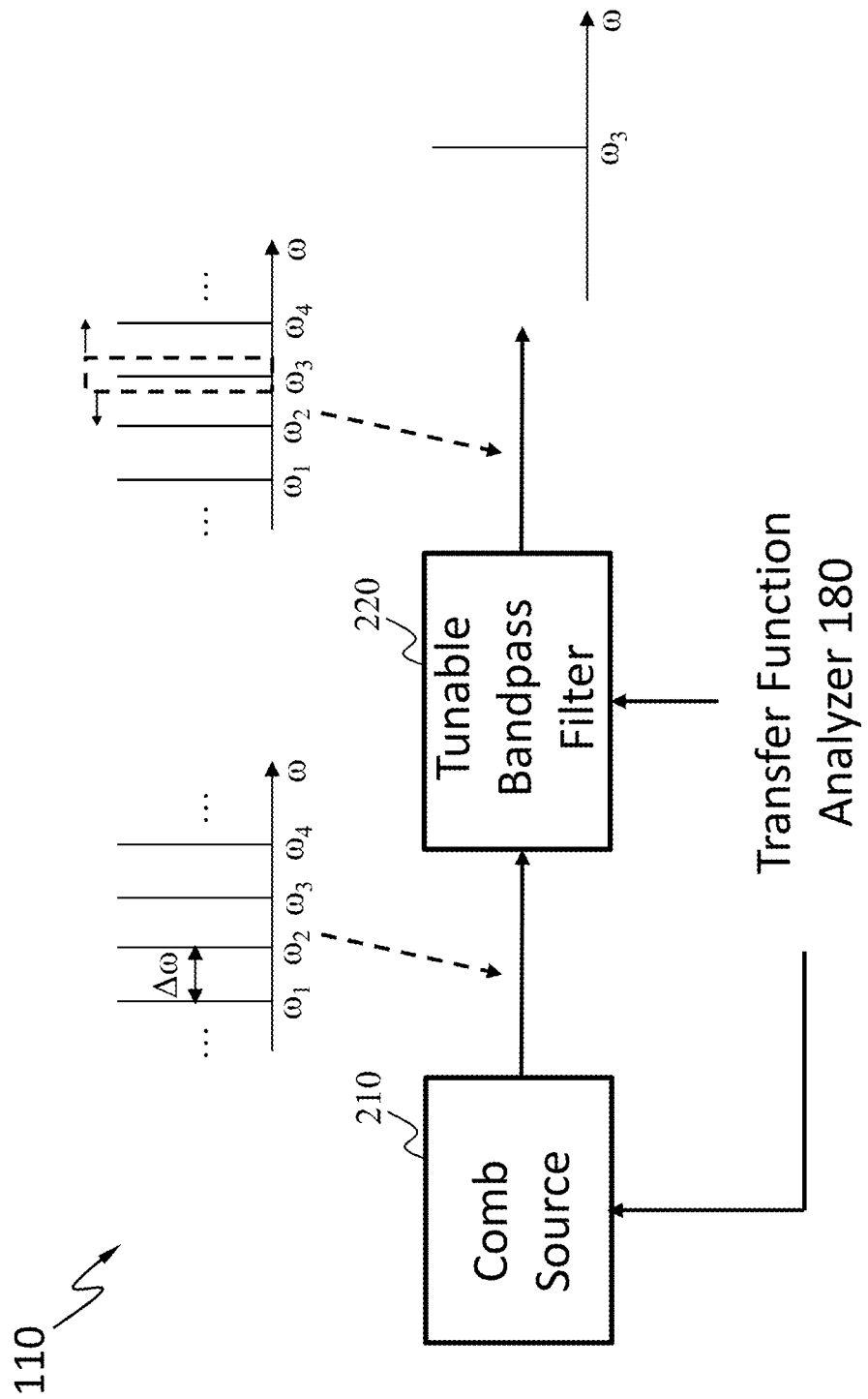
FIG. 2 is a schematic diagram of a radiation generator according to an embodiment of the present disclosure.

Referring to FIG. 2, a schematic diagram of the radiation generator 110 in FIG. 1 is shown according to an embodiment of the present disclosure. The radiation generator 110 may comprise a comb source 210 and a tunable bandpass filter 220 coupled to the comb source.

The comb source 210 may be configured to provide an optical frequency comb comprising a plurality of optical carriers. In some examples, the plurality of optical carriers may have a same amplitude or similar amplitude, resulting in a flat spectral profile. Each of the plurality of optical carriers may be centered at a different carrier frequency with a narrow linewidth (i.e., a narrow frequency range around the carrier frequency). In some other examples, the plurality of optical carriers may have different amplitudes. An example of the optical frequency comb is shown in FIG. 2. As shown, the spectral spacing between the adjacent optical carriers, denoted as $\Delta\omega$, is the same. In an embodiment, the comb source 210 may be coupled to the transfer function analyzer 180, which may be used to adjust the frequencies of the plurality of optical carriers and/or the spacing between the adjacent carriers of the comb source 210.

The tunable bandpass filter 220 may be configured to select one of the plurality of optical carriers provided by the comb source 210. The tunable bandpass filter 220 may be further configured to provide the selected carrier to the optical switch 115. For example, the tunable bandpass filter 220, whose spectral profile is denoted as a dotted rectangular, may have an operating frequency at around $\omega_3$ with a predetermined bandwidth. As such, the tunable bandpass filter 220 may be used to select an optical carrier centered at the carrier frequency of $\omega_3$, while filtering out the other optical carriers. As a result, the tunable bandpass filter 220 may provide an electromagnetic radiation (i.e., the selected optical carrier) at the carrier frequency of $\omega_3$ to the optical switch 115.

In an embodiment, the tunable bandpass filter 220 may be configured to adjust the operating frequency. For example, the tunable bandpass filter 220 may be configured to red shift the operating frequency (e.g., as shown in the leftward arrow) or blue shift the operating frequency (e.g., as shown in the rightward arrow). This is done so that an optical carrier at another carrier frequency may be selected and provided by the radiation generator 110 to the optical switch 115 after adjustment. In an embodiment, the operating frequency of the tunable bandpass filter 220 may be controlled and adjusted by the transfer function analyzer 180.

Figure 3:
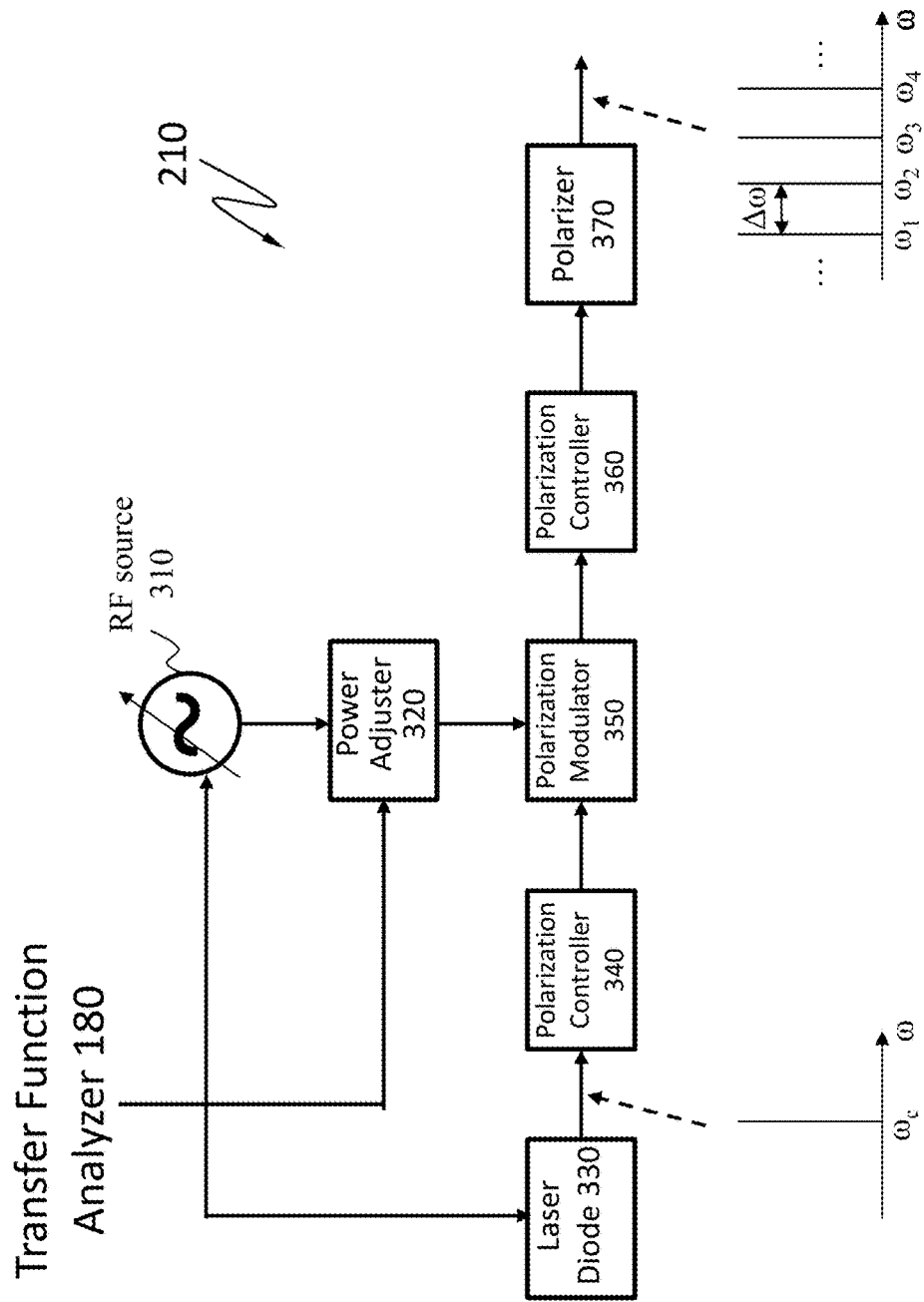
FIG. 3 is a schematic diagram of a comb source according to an embodiment of the present disclosure.

Referring to FIG. 3, a schematic diagram of the comb source 210 is shown according to an embodiment of the present disclosure. In this example, the comb source 210 may comprise a laser diode 330, a first polarization controller 340, an RF source 310, a power adjuster 320, a polarization modulator 350, a second polarization controller 360, and a polarizer 370. The first polarization controller 340 may be similar to the second polarization controller 360. The RF source 310 may be similar to the tunable RF signal generator 130 in FIG. 1. As shown, the laser diode 330, the RF source 310, and/or the power adjuster 320 may be coupled to the transfer function analyzer 180

The laser diode 330 may be configured to provide an electromagnetic radiation having a single carrier at a carrier frequency of $\omega_c$. In an embodiment, the laser diode 330 may be a single wavelength laser configured to provide the single optical carrier at the carrier frequency of $\omega_c$ with a narrow bandwidth (or a narrow linewidth). In an embodiment, the carrier frequency of $\omega_c$ may be adjusted according to the transfer function analyzer 180. In an embodiment, the tuning range of the laser diode 330 may be smaller than the tuning range of the tunable bandpass filter 220 in FIG. 2.

The first polarization controller 340 may be coupled to the laser diode 330 and configured to tune the polarization state of the electromagnetic radiation received from the laser diode 330. The first polarization controller 340 may be further configured to output the electromagnetic radiation to the polarization modulator 350 after the polarization state is adjusted.

The polarization modulator 350 may be coupled to the first polarization controller 340 and the power adjuster 320. The polarization modulator 350 may be configured to modulate the polarization of the electromagnetic radiation received from the first polarization controller 340 according to the RF signal received from the power adjuster 320. The polarization modulator 350 may be further configured to provide the electromagnetic radiation after polarization modulation to the second polarization controller 360.

The RF source 310 may be configured to provide an RF signal to the power adjuster 320 at a frequency of $\Delta\omega$. In an embodiment, the RF source 310 may be coupled to the transfer function analyzer 180, which may be used to adjust the power and/or the frequency of $\Delta\omega$. In an embodiment, the RF source 310 may be similar to the RF signal generator 130 in FIG. 1.

The power adjuster 320 may be coupled to the RF source 310 and configured to adjust the power of the RF signal provided to the polarization modulator 350. In an embodiment, the power adjuster 320 may comprise a tunable RF amplifier with an adjustable power amplification. In an embodiment, the power adjuster 320 may comprise a tunable RF attenuator with an adjustable power attenuation. In an embodiment, the amount of power amplification and/or power attenuation may be adjusted by the transfer function analyzer 180.

The second polarization controller 360 may be coupled to the polarization modulator 350 and configured to adjust the polarization state of the electromagnetic radiation received from the polarization modulator 350. The second polarization controller 360 may be further configured to provide the electromagnetic radiation after the polarization state is adjusted to the polarizer 370.

The polarizer 370 may be configured to receive the electromagnetic radiation from the second polarization controller 360 and output a portion of the electromagnetic radiation matching to a predefined polarization. By carefully adjusted the first polarization controller 340, the power adjuster 320, the polarization modulator 350, and the second polarization controller 360, the outputted portion of the electromagnetic radiation may be an optical frequency comb with an equal spacing of $\Delta\omega$ and a flat spectral profile, for example, as shown in FIG. 3. In some examples, the comb source 210 may comprise more than one polarization modulator 350 to provide a larger number of optical carriers. More details about the comb source 210 may be found in Chao He, et. al, "Ultrafast optical frequency comb generated based on cascaded polarization modulators," Optics Letters Vol. 37, No. 18, pages 3834-3836, published on Sep. 15, 2012, which is incorporated by reference in its entirety.

Figure 4:
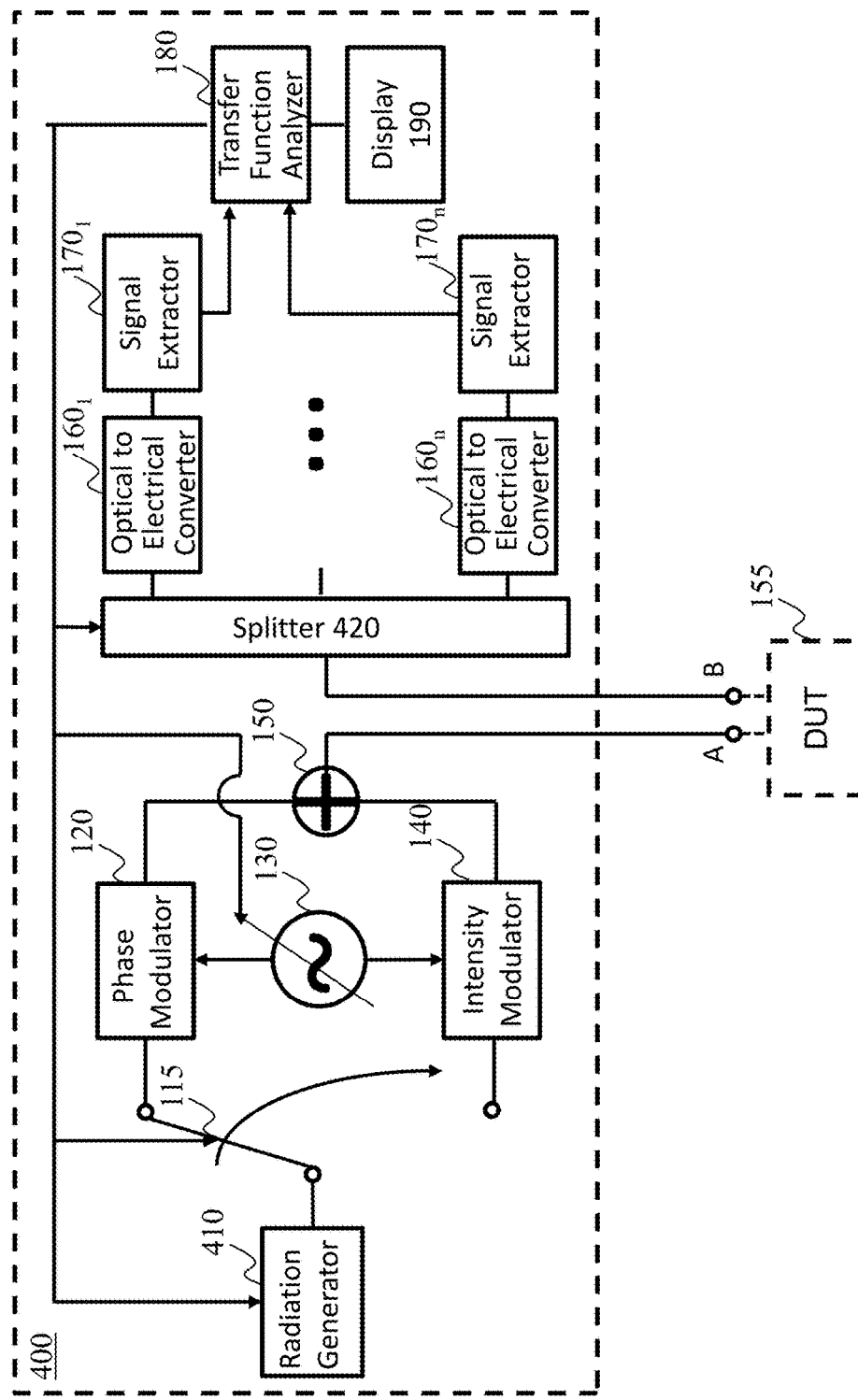
FIG. 4 is a schematic diagram of an optical vector analyzer suitable for performing an optical vector analysis on a DUT according to an embodiment of the disclosure.

Referring to FIG. 4, a schematic diagram of another optical vector analyzer 400 is shown according to an embodiment of the disclosure. The optical vector analyzer 400 may be suitable to perform the optical vector analysis of the DUT 155. As shown, the optical vector analyzer 400 comprises a radiation generator 410, the phase modulator 120, the tunable RF signal generator 130, the intensity modulator 140, the optical combiner 150, a splitter 420, a plurality of optical to electrical converters $160_{1-n}$, a plurality of signal extractors $170_{1-n}$, the transfer function analyzer 180, and the display 190.

Different than the radiation generator 110 configured to provide an electromagnetic radiation having a single carrier frequency, the radiation generator 410 may be configured to provide an electromagnetic radiation having a plurality of optical carriers, each of which corresponding to a different carrier frequency. As such, the electromagnetic radiation provided by the radiation generator 410 may be an optical frequency comb. In an embodiment, the radiation generator 410 may be similar to the comb source 210 as shown in FIG. 2. In an embodiment, the radiation generator 410 may be configured similarly to the comb source 210 as shown in FIG. 3. In an embodiment, the radiation generator 410 may be similar to the radiation generator 110 as configured in FIG. 2, with the tunable bandpass filter 220 being configured to select two or more optical carriers from the electromagnetic radiation provided by the comb source 210. In an embodiment, the radiation generator 410 may be coupled to the transfer function analyzer 180, which may adjust the carrier frequencies and/or the spacing between adjacent carrier frequencies of the electromagnetic radiation provided by the radiation generator 410.

When the optical switch 115 is configured to provide the electromagnetic radiation (i.e., the optical frequency comb) from the radiation generator 410 to the phase modulator 120, the phase modulator 120 may be configured to provide a phase modulated signal by performing a double sideband phase modulation on the electromagnetic radiation received from the radiation generator 410. Different than the phase modulated signal having a single carrier as described associated with FIG. 1, the phase modulated signal described herein may have a plurality of carriers as the electromagnetic radiation (i.e., the optical frequency comb) from the radiation generator 410. The phase modulated signal described herein may further have a sideband frequency component on either side of each carrier. Specifically, the phase modulated signal may comprise the plurality of carriers as the electromagnetic radiation from the radiation generator 410. For each of the plurality of carriers, the phase modulated signal may further comprise a first sideband frequency component having a first frequency equal to the carrier frequency minus the modulating frequency from the tunable RF signal generator 130, and a second sideband frequency component having a second frequency equal to the carrier frequency plus the modulating frequency from the tunable RF signal generator 130. In an embodiment, the tunable RF signal generator 130 may be coupled to the transfer function analyzer 180, which may be used to adjust the modulating frequency associated with the tunable RF signal generator 130. In an embodiment, the first sideband frequency component of each carrier of the phase modulated signal has a same or a similar amplitude as the second sideband frequency component of the carrier of the phase modulated signal.

When the optical switch 115 is configured to provide the electromagnetic radiation (i.e., the optical frequency comb) from the radiation generator 410 to the intensity modulator 140, the phase modulator 120 may be configured to provide an intensity modulated signal by performing a double sideband intensity modulation on the electromagnetic radiation received from the radiation generator 410. Different than the intensity modulated signal having a single carrier as described associated with FIG. 1, the intensity modulated signal described herein may have a plurality of carriers as the electromagnetic radiation (i.e., the optical frequency comb) from the radiation generator 410. The intensity modulated signal described herein may further have a sideband frequency component on either side of each carrier. Specifically, the intensity modulated signal may comprise the plurality of carriers as the electromagnetic radiation from the radiation generator 410. For each of the plurality of carriers, the intensity modulated signal may further comprise a first sideband frequency component having a first frequency equal to the carrier frequency minus the modulating frequency from the tunable RF signal generator 130, and a second sideband frequency component having a second frequency equal to the carrier frequency plus the modulating frequency from the tunable RF signal generator 130. In an embodiment, the first sideband frequency component of each carrier of the intensity modulated signal has the same or a similar amplitude as the second sideband frequency component of the carrier of the intensity modulated signal.

The optical combiner 150 may be coupled to the phase modulator 120 and the intensity modulator 140 and configured to provide the phase modulated signal from the phase modulator 120 or the intensity modulated signal from the intensity modulator 140 through the output port of the optical combiner 150, i.e., the port A, depending on whether the optical switch 115 is configured to provide the electromagnetic radiation from the radiation generator 410 to the phase modulator 120 or the intensity modulator 140.

The splitter 420 may have an input port, denoted as the port B. The input port of the splitter 420, i.e., the Port B, may be coupled to the output port of the optical combiner 150, i.e., the Port A. As a result, the splitter 420 may be configured to receive the phase modulated signal or the intensity modulated signal from the optical combiner 150 directly without passing the phase modulated signal or the intensity modulated signal through the DUT 155.

Alternatively, the input port of the splitter 420, i.e., the port B, may be coupled to an output port of the DUT 155, while the output port of the optical combiner 150, i.e., the Port A, may be coupled to the input port of the DUT 155. As a result, the phase modulated signal provided by the phase modulator 120 or the intensity modulated signal provided by the intensity modulator 140 may pass through the DUT 155, and then received by the splitter 420.

The splitter 420 may be configured to extract a single portion of the received signal, which comprises a single carrier and the associated two single sideband frequency components. In an embodiment, the splitter 420 may be coupled to the transfer function analyzer 180, which may be used to determine the single carrier to be selected by the splitter 420. The splitter 420 may be further configured to provide the single portion of the received signal to the optical to electrical converter 160 followed by the signal extractor 170, the transfer function analyzer 180, and the display 190 as shown in FIG. 1. As such, the splitter 420 may be similar to the tunable bandpass filter 220 as shown in FIG. 2. In this case, the optical vector analyzer 400 may be operated similar to the optical vector analyzer 100 as shown in FIG. 1.

Alternatively, the splitter 420 may be configured to split the received signal (i.e., the phase modulated signal or the intensity modulated signal) into a plurality of portions based on different frequency bands predetermined by the splitter 420. Each of the plurality of portions may comprise a different carrier and two associated sideband frequency components within a different frequency band. The splitter 420 may be further configured to provide each portion of the received signal to a different one of a plurality of processing channels, each of which comprises an optical to electrical converter $160_{1-n}$ and a signal extractor $170_{1-n}$. The number of the processing channels may be denoted as an integer n (n>1). In an embodiment, the integer n may be greater or equal to the number of carriers in the electromagnetic radiation (i.e., the optical frequency comb) provided by the radiation generator 410. The optical to electrical converters $160_{1-n}$ and the signal extractors $170_{1-n}$ may be similar to the optical to electrical converters 160 and the signal extractor 170, respectively. The plurality of signal extractors $170_{1-n}$ may be further coupled to the input port of the transfer function analyzer 180 followed by the display 190.

In an embodiment, the transfer function analyzer 180, as described above, may be coupled to the radiation generator 410, the optical switch 115, the tunable RF signal generator 130, and the splitter 420. The transfer function analyzer 180 may be configured to adjust the carrier frequencies of the electromagnetic radiation (i.e., the optical frequency comb) provided by the radiation generator 410. The transfer function analyzer 180 may be configured to control the optical switch 115 and determine whether to provide the electromagnetic radiation from the radiation generator 410 to the phase modulator 120 or the intensity modulator 140. The transfer function analyzer 180 may be configured to adjust the modulating frequency of the RF signal provided by the tunable RF signal generator 130. The transfer function analyzer 180 may be configured to adjust the frequency band distribution associated with the plurality of frequency channels.

Similar to the description above associated with the optical vector analyzer 100, the device characterization process and the system calibration process as described associated with FIG. 1 may be implemented respectively in order to perform the optical vector analysis on the DUT 155 using the optical vector analyzer 400. However, by including a plurality of frequency channels in parallel each comprising an optical to electrical converter $160_{1-n}$ and a signal extractor $170_{1-n}$, the transfer function analyzer 180 in FIG. 4 may determine the transfer function of the DUT 155 at a greater number of operating frequencies upon completion of one device characterization process and one system calibration process. Further, one or more additional device characterization processes and system calibration processes, as described above, may be performed to determine the transfer functions of the DUT 155 at other operating frequencies after adjusting the carrier frequencies associated with the radiation generator 410 and/or the modulating frequency associated with the tunable RF signal generator 130 by, e.g., the transfer function analyzer 180 in the optical vector analyzer 400 as shown in FIG. 4.

Figure 5:
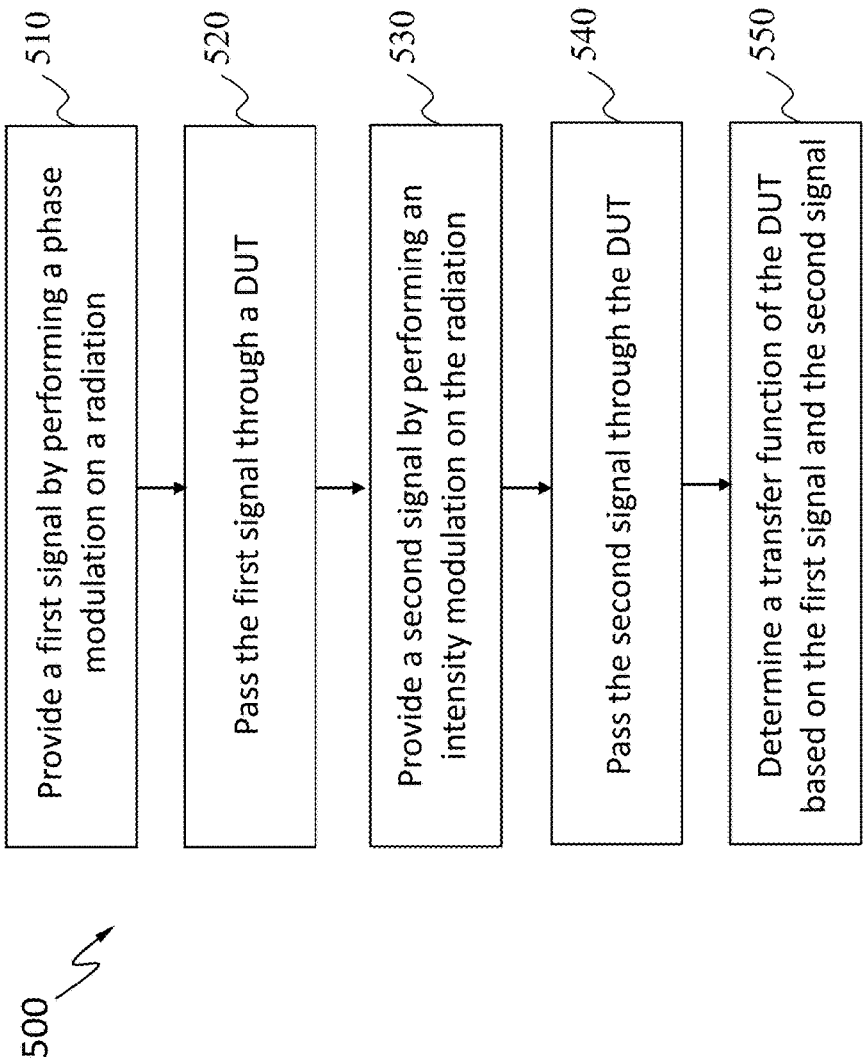
FIG. 5 is a flowchart of an exemplary process for performing an optical vector analysis on a DUT by an optical vector analyzer according to an embodiment of the disclosure.

Referring to FIG. 5, a flowchart 500 of an exemplary process for performing the optical vector analysis on the DUT 155 by the optical vector analyzer 100, 400 is shown according to an embodiment of the disclosure. At step 510, a first signal is provided by performing phase modulation on a radiation. In an embodiment, the step 510 may be performed when the optical switch 115 is configured to provide the radiation from the radiation generator 110, 410 to the phase modulator 120. In an embodiment, the phase modulation may be a double sideband phase modulation performed by the phase modulator 120. The first signal may include a carrier at a carrier frequency and a sideband component on either side of the carrier. In an embodiment, the amplitudes of the two sideband components of the first signal may be the same or similar. At step 520, the first signal is passed through the DUT 155.

At step 530, a second signal is provided by performing intensity modulation on the radiation. In an embodiment, the step 530 may be performed when the optical switch 115 is configured to provide the radiation from the radiation generator 110, 410 to the intensity modulator 140. In an embodiment, the intensity modulation may be a double sideband intensity modulation performed by the intensity modulator 140. The second signal may include a carrier at the carrier frequency and a sideband component on either side of the carrier. In an embodiment, the amplitudes of the two sideband components of the second signal may be the same or similar. At step 540, the second signal is passed through the DUT 155. At step 550, a transfer function of the DUT 155 may be determined, e.g., by the transfer function analyzer 180, based on the first signal and the second signal.

Figure 6:
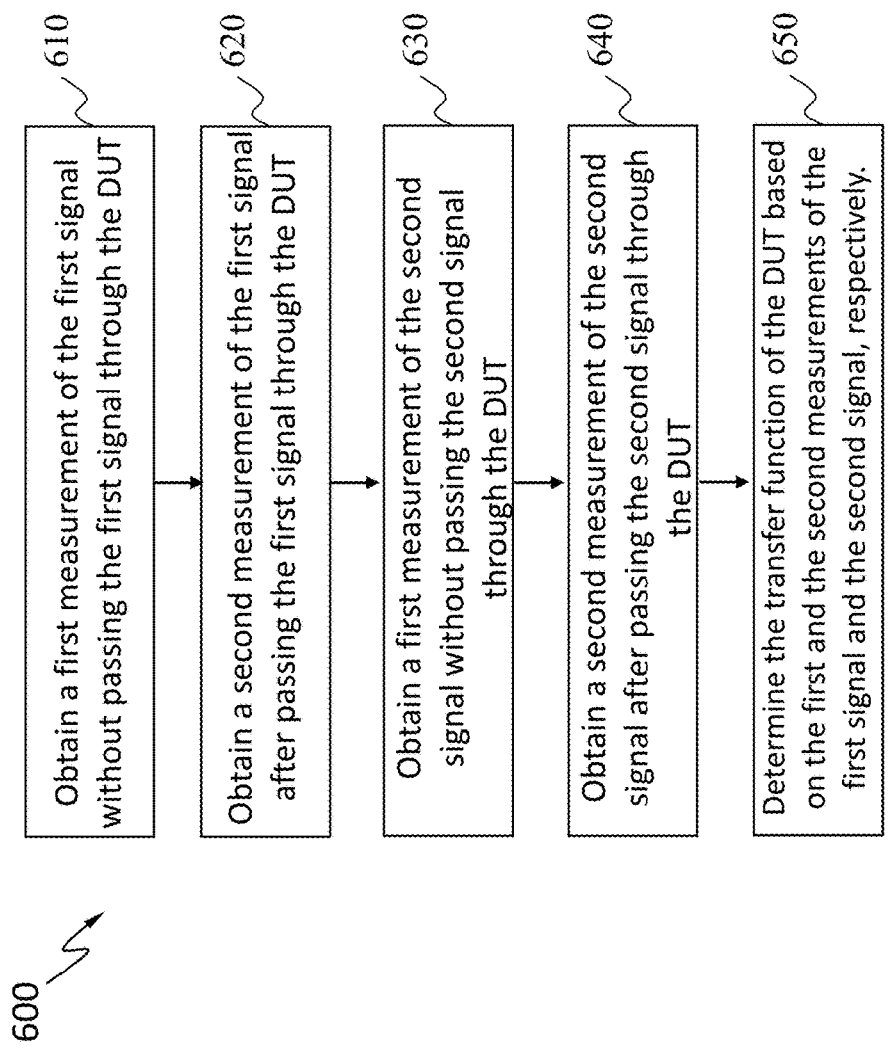
FIG. 6 is a flowchart of an exemplary process for performing an optical vector analysis on a DUT by an optical vector analyzer according to an embodiment of the disclosure.

Referring to FIG. 6, a flowchart 600 of an exemplary process for performing the optical vector analysis on the DUT 155 is shown according to an embodiment of the disclosure. In an embodiment, the exemplary process as shown in the flowchart 600 may be performed by the optical vector analyzer 100, 400.

At step 610, a first measurement of a first signal without passing the first signal through the DUT 155 may be obtained, for example, by the transfer function analyzer 180. The first signal may be provided by performing phase modulation on the radiation received from the radiation generator 110, 410 when the optical switch 115 is configured to provide the radiation from the radiation generator 110, 410 to the phase modulator 120. In an embodiment, the step 610 may be performed in a system calibration process, when the output port of the optical combiner 150 (i.e., Port A) is coupled to the input port of the optical to electrical converter 160 (i.e., Port B). As such, at least a portion of the first signal (without passing through the DUT 155) may be converted to a first electrical current, the power of which is measured by, e.g., the signal extractor 170.

At step 620, a second measurement of the first signal after passing the first signal through the DUT 155 may be obtained, for example, by the transfer function analyzer 180. In an embodiment, the step 620 may be performed in a device characterization process, when the output port of the optical combiner 150 (i.e., Port A) is coupled to the input port of the DUT 155, and the input port of the optical to electrical converter 160 (i.e., Port B) is coupled to the output port of the DUT 155. As such, at least a portion of the first signal (after passing through the DUT 155) may be converted to a second electrical current, the power of which is measured by, e.g., the signal extractor 170.

At step 630, a first measurement of a second signal without passing the second signal through the DUT 155 may be obtained, for example, by the transfer function analyzer 180. The second signal may be provided by performing intensity modulation on the radiation received from the radiation generator 110, 410 when the optical switch 115 is configured to provide the radiation from the radiation generator 110, 410 to the intensity modulator 140. In an embodiment, the step 630 may be performed in the system calibration process, when the output port of the optical combiner 150 (i.e., Port A) is coupled to the input port of the optical to electrical converter 160 (i.e., Port B). As such, at least a portion of the second signal (without passing through the DUT 155) may be converted to a third electrical current, the power of which is measured by, e.g., the signal extractor 170.

At step 640, a second measurement of the second signal after passing the second signal through the DUT 155 may be obtained, for example, by the transfer function analyzer 180. In an embodiment, the step 640 may be performed in the device characterization process, when the output port of the optical combiner 150 (i.e., Port A) is coupled to the input port of the DUT 155, and the input port of the optical to electrical converter 160 (i.e., Port B) is coupled to the output port of the DUT 155. As such, at least a portion of the second signal (after passing through the DUT 155) may be converted to a fourth electrical current, the power of which is measured by, e.g., the signal extractor 170.

At step 650, the transfer function of the DUT may be determined, e.g., by the transfer function analyzer 180, based on the first measurement of the first signal, the second measurement of the first signal, the first measurement of the second signal, and the second measurement of the second signal.

In an embodiment, there is provided an apparatus comprising: a phase modulator having a first input port to receive a radiation and having a first output port to provide a first signal toward a DUT, wherein the phase modulator is configured to generate the first signal by performing phase modulation on the radiation received at the first input port; an intensity modulator having a second input port to receive the radiation and having a second output port to provide a second signal toward the DUT, wherein the intensity modulator is configured to generate the second signal by performing intensity modulation on the radiation received at the second input port; and a transfer function analyzer configured to determine a transfer function of the DUT based on the first signal and the second signal.

In an embodiment, the apparatus further comprises an RF signal generator configured to provide an RF signal to the intensity modulator and the phase modulator.

In an embodiment, a frequency of the RF signal provided by the RF signal generator is adjustable.

In an embodiment, a first frequency component of the first signal has a first frequency equal to a carrier frequency of the radiation, wherein a second frequency component of the first signal has a second frequency equal to the carrier frequency of the radiation minus a frequency of the RF signal provided by the RF signal generator, wherein a third frequency component of the first signal has a third frequency equal to the carrier frequency of the radiation plus the frequency of the RF signal, and wherein the second frequency component of the first signal has a same amplitude as the third frequency component of the first signal.

In an embodiment, a first frequency component of the second signal has a first frequency equal to a carrier frequency of the radiation, wherein a second frequency component of the second signal has a second frequency equal to the carrier frequency of the radiation minus a frequency of the RF signal provided by the RF signal generator, wherein a third frequency component of the second signal has a third frequency equal to the carrier frequency of the radiation plus the frequency of the RF signal, and wherein the second frequency component of the second signal has a same amplitude as the third frequency component of the second signal.

In an embodiment, the apparatus further comprises an optical combiner, wherein the optical combiner has a first input port to be coupled to the first output port of the phase modulator, and a second input port to be coupled to the second output port of the intensity modulator, and an output configured to be coupled to an input port of the DUT.

In an embodiment, the apparatus further comprises an optical to electrical converter configured to receive an optical signal provided by the DUT and convert the optical signal to an electrical current.

In an embodiment, the apparatus further comprises a signal extractor coupled to the optical to electrical converter, wherein the signal extractor is configured to measure the electrical current provided by the optical to electrical converter, wherein the signal extractor has an input port to receive the electrical current and an output port to provide a measurement of the electrical current to the transfer function analyzer, and wherein the measurement of the electrical current comprises an amplitude and a phase of the electrical current.

In an embodiment, the apparatus further comprises a radiation generator configured to provide the radiation toward the phase modulator and the intensity modulator.

In an embodiment, the radiation generator comprises a laser diode configured to provide a frequency carrier at a carrier frequency.

In an embodiment, the apparatus further comprises an optical switch coupled to the radiation generator, wherein the optical switch is configured to provide the radiation generated by the radiation generator toward the phase modulator or the intensity modulator.

In an embodiment, the apparatus further comprises a splitter, wherein the splitter has an input port configured to receive the first signal or the second signal, and an output port configured to provide the optical signal to the optical to electrical converter, wherein the optical signal is a portion of the first signal or the second signal, and wherein the output port of the splitter is coupled to an input port of the optical to electrical converter.

In an embodiment, there is provided a method comprising: providing a first signal by performing phase modulation on a radiation; passing the first signal through a DUT; providing a second signal by performing intensity modulation on the radiation; passing the second signal through the DUT; and determining a transfer function of the DUT based on the first signal and the second signal.

In an embodiment, the determining the transfer function of the DUT comprises: obtaining a first measurement of the first signal without passing the first signal through the DUT; obtaining a second measurement of the first signal after passing the first signal through the DUT; obtaining a first measurement of the second signal without passing the second signal through the DUT; obtaining a second measurement of the second signal after passing the second signal through the DUT; and determining the transfer function of the DUT based on the first measurement of the first signal, the second measurement of the first signal, the first measurement of the second signal, and the second measurement of the second signal.

In an embodiment, the first measurement of the first signal is obtained by: converting at least a portion of the first signal to a first electrical current without passing the first signal through the DUT; and measuring a power of the first electrical current.

In an embodiment, the second measurement of the first signal is obtained by: converting at least a portion of the first signal to a second electrical current after passing the first signal through the DUT; and measuring a power of the second electrical current.

In an embodiment, the first measurement of the second signal is obtained by: converting at least a portion of the second signal to a third electrical current without passing the second signal through the DUT; and measuring a power of the third electrical current.

In an embodiment, the second measurement of the second signal is obtained by: converting at least a portion of the second signal to a fourth electrical current after passing the second signal through the DUT; and measuring a power of the fourth electrical current.

In an embodiment, the radiation is generated by a radiation generator, and wherein the radiation generator comprises a single wavelength laser.

In an embodiment, there is provided a machine-readable tangible and non-transitory medium having information, wherein the information, when read by a hardware processor system, causes the hardware processor system to perform following: providing a first signal by performing phase modulation on a radiation; passing the first signal through a DUT; providing a second signal by performing intensity modulation on the radiation; passing the second signal through the DUT; and determining a transfer function of the DUT based on the first signal and the second signal.

Figure 7:
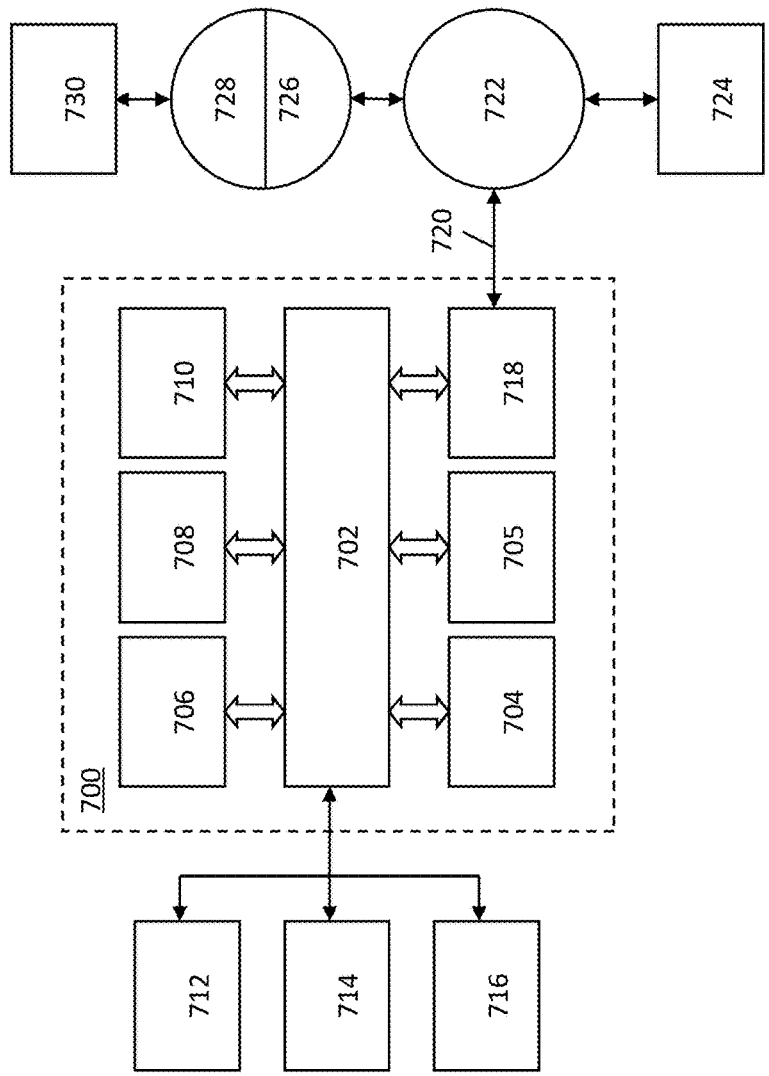
FIG. 7 depicts a general computer architecture on which the present disclosure can be implemented.

Referring to FIG. 7, a computer system 700 is shown. The computer system 700 includes a bus 702 or other communication mechanism to communicate information, and a processor 704 (or multiple processors 704 and 705) coupled with bus 702 to process information. In an embodiment, computer system 700 includes a main memory 706, such as a random access memory (RAM) or other dynamic storage device, coupled to bus 702 to store information and instructions to be executed by processor 704. Main memory 706 may be used to store temporary variables or other intermediate information during execution of instructions to be executed by processor 704. In an embodiment, computer system 700 includes a read only memory (ROM) 708 or other static storage device coupled to bus 702 to store essentially static information and instructions for processor 704. In an embodiment, a storage device 710, such as a solid state drive, magnetic disk or optical disk, is provided and coupled to bus 702 to store information and instructions.

Computer system 700 may be coupled via bus 702 to a display 712, such as a cathode ray tube (CRT) or flat panel or touch panel display, to display information to a computer user. In an embodiment, an input device 714, including or providing alphanumeric and other keys, is coupled to bus 702 to communicate information and command selections to processor 704. Another type of user input device is cursor control 716, such as a mouse, a trackball, or cursor direction keys, to communicate direction information and command selections to processor 704 and to control cursor movement on display 712. A touch panel (screen) display may also be used as an input device.

The computer system 700 may be suitable to implement methods as described herein in response to processor 704 executing one or more sequences of one or more instructions contained in, e.g., main memory 706. Such instructions may be read into main memory 706 from another computer-readable medium, such as storage device 710. In an embodiment, execution of sequences of instructions contained in main memory 706 causes processor 704 to perform process steps described herein. One or more processors in a multi-processing arrangement may be employed to execute the sequences of instructions contained in main memory 706. In an embodiment, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media include, for example, solid state, optical or magnetic disks, such as storage device 710. Volatile media include dynamic memory, such as main memory 706. Non-volatile and volatile media are considered non-transitory. Non-transitory transmission media include coaxial cables, copper wire and fiber optics, including the wires that comprise bus 702. Transmission media can also take the form of acoustic or light waves, such as those generated during RF and infrared (IR) data communications. Common forms of computer-readable media include, for example, a floppy disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, a solid state disk or any other memory chip or cartridge, a carrier wave as described herein, or any other medium from which a computer can read.

Various forms of computer readable media may be involved in carrying one or more sequences of one or more instructions to processor 704 for execution. For example, the instructions may initially be borne on a magnetic disk of a remote computer. The remote computer can load the instructions into its dynamic memory and send the instructions over communications medium (e.g., by line or wireless). Computer system 700 can receive the transmitted data and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 may also include a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network, commonly referred to as the internet 728. Local network 722 and internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720, and communication interface 718. In the internet example, a server 730 might transmit a requested code for an application program through internet 728, ISP 726, local network 722 and communication interface 718. In accordance with one or more embodiments, one such downloaded application implements a method as described herein. The received code may be executed by processor 704 as it is received, and/or stored in storage device 710, or other non-volatile storage for later execution. In this manner, computer system 700 may obtain application code.

An embodiment may take the form of a computer program containing one or more sequences of machine-readable instructions describing a method as disclosed herein, or a data storage medium (e.g. semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the optical vector analyzer. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according the machine readable instructions of one or more computer programs.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. An apparatus comprising:
    a phase modulator having a first input port to receive a radiation and having a first output port to provide a first signal toward a device under test (DUT), wherein the phase modulator is configured to generate the first signal by performing phase modulation on the radiation received at the first input port;
    an intensity modulator having a second input port to receive the radiation and having a second output port to provide a second signal toward the DUT, wherein the intensity modulator is configured to generate the second signal by performing intensity modulation on the radiation received at the second input port; and
    a transfer function analyzer configured to determine a transfer function of the DUT based on the first signal and the second signal.

2. The apparatus of claim 1, further comprising a radio-frequency (RF) signal generator configured to provide an RF signal to the intensity modulator and the phase modulator.

3. The apparatus of claim 2, wherein a frequency of the RF signal provided by the RF signal generator is adjustable.

4. The apparatus of claim 2, wherein a first frequency component of the first signal has a first frequency equal to a carrier frequency of the radiation, wherein a second frequency component of the first signal has a second frequency equal to the carrier frequency of the radiation minus a frequency of the RF signal provided by the RF signal generator, wherein a third frequency component of the first signal has a third frequency equal to the carrier frequency of the radiation plus the frequency of the RF signal, and wherein the second frequency component of the first signal has a same amplitude as the third frequency component of the first signal.

5. The apparatus of claim 2, wherein a first frequency component of the second signal has a first frequency equal to a carrier frequency of the radiation, wherein a second frequency component of the second signal has a second frequency equal to the carrier frequency of the radiation minus a frequency of the RF signal provided by the RF signal generator, wherein a third frequency component of the second signal has a third frequency equal to the carrier frequency of the radiation plus the frequency of the RF signal, and wherein the second frequency component of the second signal has a same amplitude as the third frequency component of the second signal.

6. The apparatus of claim 2, further comprising an optical combiner, wherein the optical combiner has a first input port to be coupled to the first output port of the phase modulator, a second input port to be coupled to the second output port of the intensity modulator, and an output port configured to be coupled to an input port of the DUT.

7. The apparatus of claim 6, further comprising an optical to electrical converter configured to receive an optical signal provided by the DUT and convert the optical signal to an electrical current.

8. The apparatus of claim 7, further comprising a splitter, wherein the splitter has an input port configured to receive the first signal or the second signal, and an output port configured to provide the optical signal to the optical to electrical converter, wherein the optical signal is a portion of the first signal or the second signal, and wherein the output port of the splitter is coupled to an input port of the optical to electrical converter.

9. The apparatus of claim 7, further comprising a signal extractor coupled to the optical to electrical converter, wherein the signal extractor is configured to measure the electrical current provided by the optical to electrical converter, wherein the signal extractor has an input port to receive the electrical current and an output port to provide a measurement of the electrical current to the transfer function analyzer, and wherein the measurement of the electrical current comprises an amplitude and a phase of the electrical current.

10. The apparatus of claim 9, further comprising a radiation generator configured to provide the radiation toward the phase modulator and the intensity modulator.

11. The apparatus of claim 10, wherein the radiation generator comprises a laser diode configured to provide an optical carrier at a carrier frequency.

12. The apparatus of claim 10, further comprising an optical switch coupled to the radiation generator, wherein the optical switch is configured to provide the radiation generated by the radiation generator toward the phase modulator or the intensity modulator.

13. A method comprising:
    providing a first signal by performing phase modulation on a radiation;
    passing the first signal through a device under test (DUT);
    providing a second signal by performing intensity modulation on the radiation;
    passing the second signal through the DUT; and
    determining a transfer function of the DUT based on the first signal and the second signal.

14. The method of claim 13, wherein the determining the transfer function of the DUT comprises:
    obtaining a first measurement of the first signal without passing the first signal through the DUT;
    obtaining a second measurement of the first signal after passing the first signal through the DUT;
    obtaining a first measurement of the second signal without passing the second signal through the DUT;
    obtaining a second measurement of the second signal after passing the second signal through the DUT; and
    determining the transfer function of the DUT based on the first measurement of the first signal, the second measurement of the first signal, the first measurement of the second signal, and the second measurement of the second signal.

15. The method of claim 14, wherein the first measurement of the first signal is obtained by:
    converting at least a portion of the first signal to a first electrical current without passing the first signal through the DUT; and
    measuring a power of the first electrical current.

16. The method of claim 14, wherein the second measurement of the first signal is obtained by:

converting at least a portion of the first signal to a second electrical current after passing the first signal through the DUT; and measuring a power of the second electrical current.

17. The method of claim 14, wherein the first measurement of the second signal is obtained by:

converting at least a portion of the second signal to a third electrical current without passing the second signal through the DUT; and measuring a power of the third electrical current.

18. The method of claim 14, wherein the second measurement of the second signal is obtained by:

converting at least a portion of the second signal to a fourth electrical current after passing the second signal through the DUT; and measuring a power of the fourth electrical current.

19. The method of claim 13, wherein the radiation is generated by a radiation generator, and wherein the radiation generator comprises a single wavelength laser.

20. A machine-readable tangible and non-transitory medium having information, wherein the information, when read by a hardware processor system, causes the hardware processor system to perform following:

providing a first signal by performing phase modulation on a radiation;

passing the first signal through a device under test (DUT);

providing a second signal by performing intensity modulation on the radiation;

passing the second signal through the DUT; and determining a transfer function of the DUT based on the first signal and the second signal.

* * * * *